Dec. 6, 1927.  
A. FELTON  
LAWN TRIMMER  
Filed Aug. 19, 1925

1,651,759

2 Sheets-Sheet 1

Inventor  
Alfred Felton  
By Attorneys  
Ward, Crosby & Smith.

Dec. 6, 1927.  A. FELTON  1,651,759
LAWN TRIMMER
Filed Aug. 19, 1925  2 Sheets-Sheet 2
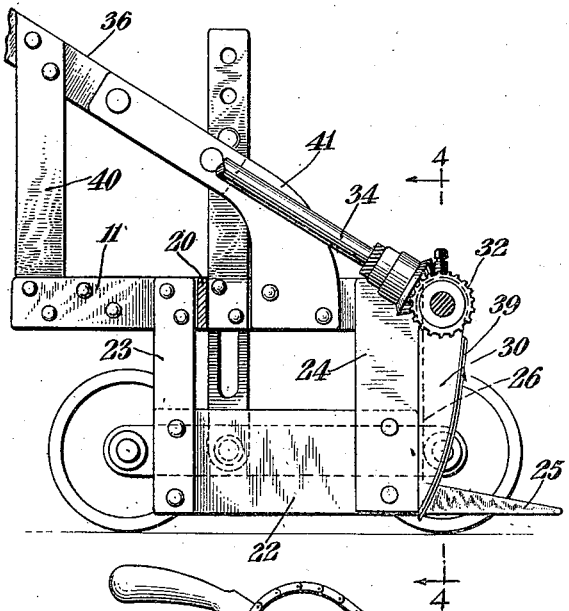
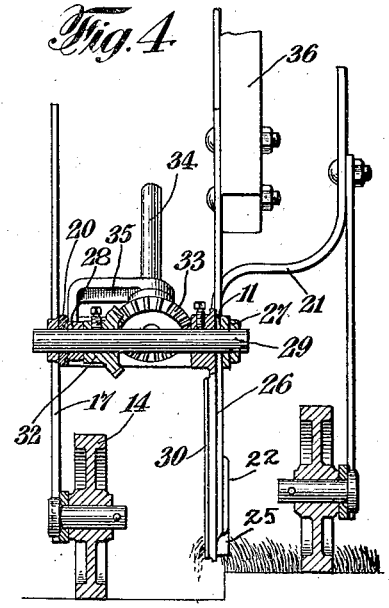
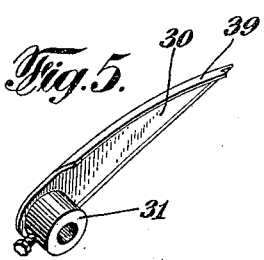
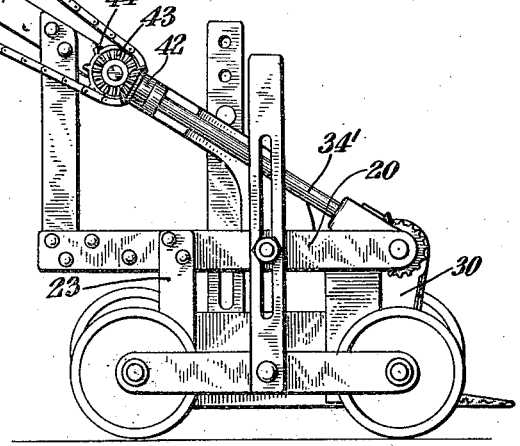
Inventor
Alfred Felton
By Attorneys
Ward, Crosby & Smith.

Patented Dec. 6, 1927.

1,651,759

UNITED STATES PATENT OFFICE.

ALFRED FELTON, OF NEWBURGH, NEW YORK.

LAWN TRIMMER.

Application filed August 19, 1925. Serial No. 51,097.

This invention relates to lawn edge trimmers or machines for cutting grass or other vegetation along the edges of a path, drive or garden.

One of the objects of this invention is to provide an efficient machine of the above stated class which will operate satisfactorily over uneven ground.

A further object of the invention is to provide a machine which may be adjusted to operate along lawn edges, the elevations of which differ by several inches or more from the elevation of the walk or driveway.

Another aim of the invention is to provide a machine of the type indicated which is easy to propel and which does not become clogged during its operation.

Figure 1:
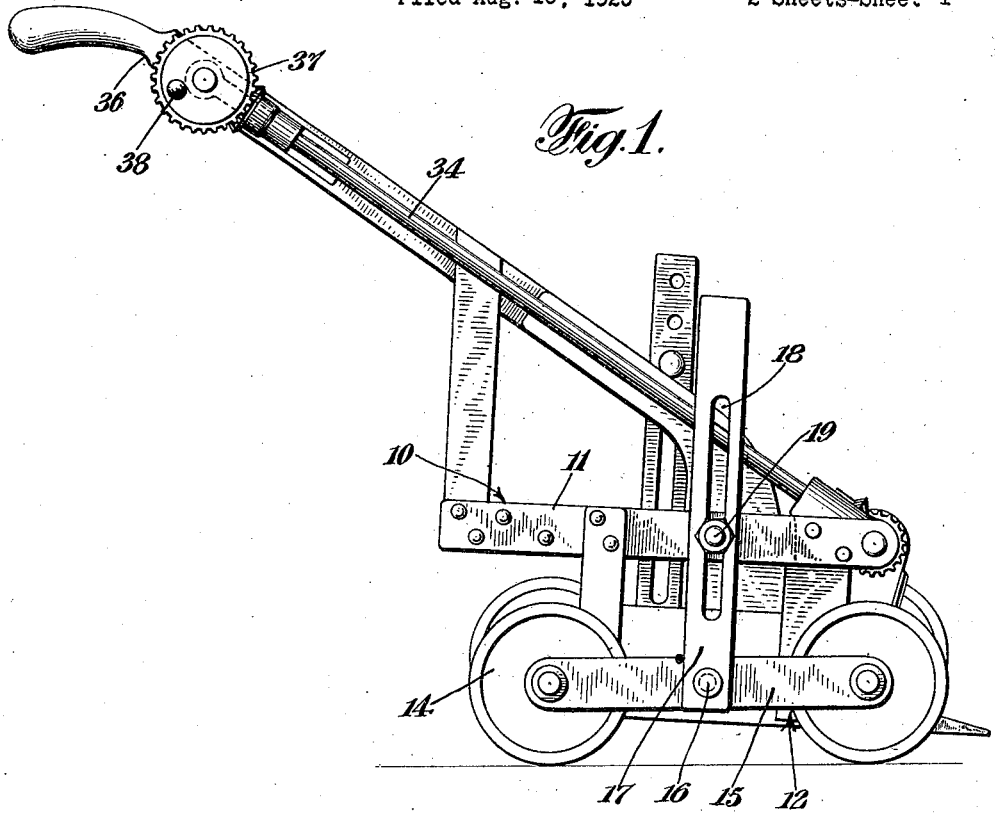
Figure 2:
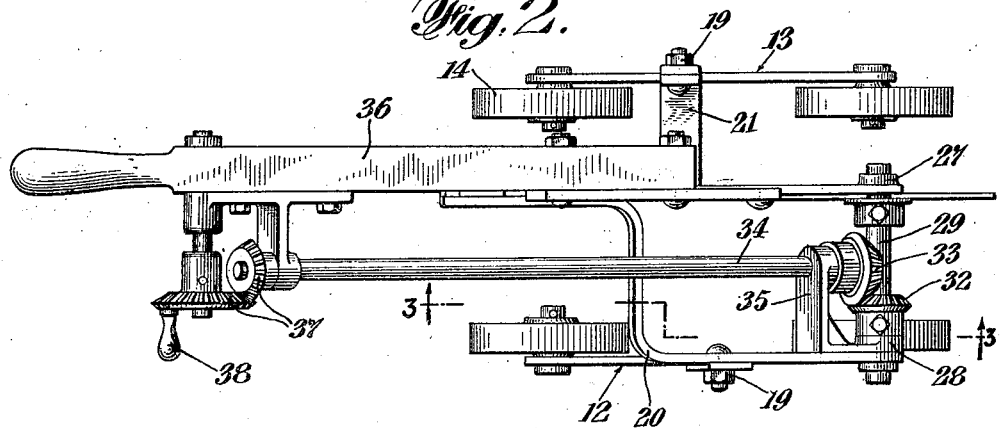

Further objects of the invention comprise the provision of a trimmer or mower of this class which is not only simple in construction, but is also durable and dependable in operation. Still further and more specific objects, features and advantages will more clearly appear from the following detailed description taken in connection with the accompanying drawings in which Fig. 1 is a side elevational view of a lawn edge trimmer embodying my improvements in a preferred form thereof, Fig. 2 is a plan view of the machine of Fig. 1, Fig. 3 is a section of the same taken on the line 3—3 of Fig. 2, Fig. 4 is a section taken substantially upon the line 4—4 of Fig. 3, Fig. 5 is a detail perspective view showing one of the cutting blades, and Fig. 6 is a side elevational view of a modified form of machine embodying my improvements.

Referring to the drawings, 10 represents a supporting frame comprising a central supporting bar 11 to which the various portions of the machine are attached. Each side of the supporting frame is carried upon trucks 12 and 13 respectively, each of which trucks have a pair of wheels as at 14 arranged in alignment along the lawn edge and mounted upon truck bars as at 15, which may be pivotally connected as at 16 to adjustable and substantially vertically extending attaching bars 17. The bars 17 may be slotted as at 18 for receiving a bolt and nut at 19 for adjustably fixing the bars upon side frame members 20 and 21 respectively, which in turn are fixed to the central frame member 11.

A stationary member 22 extending vertically a substantial distance may be fixed to supporting members 23 and 24 depending from the central frame member 11 to provide stationary blade parts. An inclined finger 25 extends forward from the lower edge of the member 22 for raising the grass against the forward edge 26 of the stationary member. The lower edges of the blade 22 and finger 25 are in horizontal alignment and extend substantially parallel to the ground and the lawn edge which is to be trimmed. These edges pressing against the grass and earth serve to clearly define the trimmed edge of the lawn.

The frame members 11 and 20 respectively may be provided with bearings as at 27 and 28 for receiving a rotatable shaft 29. A rotatable blade 30 is provided for cooperating with the stationary member 22 and is formed with a collar 31 provided with a set screw for fixing the blade upon the shaft 29. A bevelled gear 32 may also be fixed upon the shaft 29 to cooperate with a corresponding gear 33 mounted upon a shaft 34 extending through a bracket 35, which may form an extension to the bearing member 28.

The shaft 34 may extend upwardly in an inclined direction along a handle member 36 upon which are mounted suitable cooperating gears at 37 and an operating crank 38.

The operator may propel the device by means of the handle member 36 and at the same time by turning the crank 38, the shaft 34 is rotated and imparts a rotational movement to the gears 32 and 33 and to the shaft 29 which causes the movable blade 30 to rotate in a vertical plane along the lawn edge. As the machine proceeds, the finger 25 extends beneath the overhanging grass at the lawn edge and raises such grass into contact with the stationary blade parts where it is periodically cut off by the rotating blade. As appears in Fig. 5, the rotating blade 30, may be provided with a bevelled rear edge as at 39 which not only strengthens the blade, but also serves to throw aside the cut grass or other material when cut, the material being thrown toward the walk or driveway side of the machine.

As indicated in Fig. 3, the handle member 36 may be securely fixed to the central supporting frame 11 by means of attaching plates 40 and 41.

From the description it will be seen that a lawn edge trimmer is provided having a supporting frame mounted upon wheels providing a wheel base of substantial area. Furthermore, the trucks at each side of the frame may be independently adjusted in order to provide for differences in elevation of the lawn side and the walk or drive side of the lawn edge, as appears in Fig. 4. Also each of the trucks being pivotally mounted at the pivoting point 16 are free to independently follow any ground inclinations that are encountered, and since the supporting frame has a wheel base of substantial length and width any depression or elevation which affects one of the wheels will have very little effect upon the elevation of the cutting blades.

In the modified form of machine, as illustrated in Fig. 6, an operating shaft 34' extends upwardly along a handle 36' for a short distance and is provided with a pair of cooperating gears 42 and 43. The gear 43 is provided with a sprocket 44 for receiving an endless chain 45 running over a larger sprocket 46 at the upper end of the handle member 36'. The sprocket 46 may be provided with an operating crank 47. A sprocket and chain arrangement of this type provides a smooth running, positive drive, and a gear ratio which may be varied within wide limits by proper design of the sprockets.

While I have described my improvements in detail with respect to two embodiments thereof, I do not desire to be limited to such forms since many changes and modifications may be made without departing from the spirit and scope of the invention in its broader aspects. I therefore desire to cover all forms and changes coming within the scope of any one or more of the appended claims.

What I claim as new and desire to secure by Letters Patent, is:

1. A trimming device of the type described comprising a supporting frame mounted upon wheels, a substantially vertical stationary blade depending from the frame, and a rotary cutting blade cooperating with said stationary blade and being provided with a bevelled rear edge for strengthening the blade and also for throwing the cut grass from the lawn, and an operating handle provided with means for rotating the movable blade.

2. A lawn edge trimmer comprising a supporting frame each side of which is carried upon a truck having a plurality of wheels in alignment along the lawn edge and providing a wheel base of substantial area, attaching means between the trucks and the frame permitting independent elevational adjustments of each side of the frame and having pivotal connections permitting the trucks to independently follow ground inclinations, a stationary blade mounted upon the frame, a movable blade cooperating with said stationary blade and mounted for rotation along the lawn edge, and an operating handle provided with means for rotating the movable blade.

3. A device of the type described comprising a supporting frame each side of which is carried upon an independent truck, attaching means between the trucks and the frame having pivotal connections permitting the trucks to independently follow ground inclinations, cooperating cutting blades mounted upon said frame, and an operating handle provided with means for operating one of said blades.

4. A lawn edge trimmer comprising a supporting frame carried upon trucks, a substantially vertical stationary blade depending from the frame centrally thereof, an inclined finger extending forward from the lower edge of said blade for raising the grass, a single movable blade cooperating with said stationary blade and finger and mounted for rotation in a vertical plane along the lawn edge, and an operating handle provided with means for rotating the movable blade.

5. A lawn trimmer comprising a supporting frame each side of which is carried upon a truck having a plurality of wheels in alignment in the direction of movement of the trimmer and providing a wheel base of substantial area, attaching means between the trucks and the frame permitting independent elevational adjustments of each side of the frame and having pivotal connections permitting the trucks to independently follow ground inclinations, a stationary blade mounted on the frame, a movable blade cooperating with said stationary blade, and an operating handle provided with means for operating the movable blade.

6. A lawn edge trimmer comprising a supporting frame carrying a rotatable cutting blade provided with a bevelled rear edge for strengthening the blade and also for throwing the cut grass from the lawn, and means for rotating the blade.

7. A lawn edge trimmer comprising a supporting frame, a substantially vertical stationary blade depending from the frame centrally thereof, an inclined finger extending forward from the lower edge of said blade for raising the grass, a single movable cutting blade cooperating with said stationary blade and finger and mounted for rotation in a vertical plane along the lawn edge, said movable blade being provided with a bevelled rear edge for strengthening the blade and also for throwing the cut grass from the lawn, and means for rotating the movable blade.

8. A lawn edge trimmer comprising a supporting frame, a substantially vertical stationary blade depending from the frame centrally thereof, an inclined finger extending forward from the lower edge of said blade for raising the grass, a single movable blade cooperating with said stationary blade and finger and mounted for rotation in a vertical plane along the lawn edge, and means for rotating the movable blade.

9. A lawn edge trimmer comprising a supporting frame each side of which is carried upon a truck having a plurality of wheels in alignment along the lawn edge and providing a wheel base of substantial area, attaching means between the trucks and the frame permitting independent elevational adjustments of each side of the frame and having pivotal connections permitting the trucks to independently follow ground inclinations, a substantially vertical stationary blade depending from the frame centrally thereof, an inclined finger extending forward from the lower edge of said blade for raising the grass, and a single movable blade cooperating with said stationary blade and finger and mounted for rotation in a vertical plane along the lawn edge.

10. A lawn edge trimmer comprising a supporting frame each side of which is carried upon a truck having a plurality of wheels in alignment along the lawn edge and providing a wheel base of substantial area, attaching means between the trucks and the frame permitting independent elevational adjustments of each side of the frame and having pivotal connections permitting the trucks to independently follow ground inclinations, a substantially vertical stationary blade depending from the frame centrally thereof, an inclined finger extending forward from the lower edge of said blade for raising the grass, a single movable blade cooperating with said stationary blade and finger, and an operating handle provided with means for operating the movable blade.

11. A lawn edge trimmer comprising a supporting frame each side of which is carried upon a truck having a plurality of wheels in alignment along the lawn edge and providing a wheel base of substantial area, attaching means between the trucks and the frame permitting independent elevational adjustments of each side of the frame and having pivotal connections permitting the trucks to independently follow ground inclinations, a substantially vertical stationary blade depending from the frame centrally thereof, an inclined finger extending forward from the lower edge of said blade for raising the glass, a movable blade cooperating with said stationary blade and finger and mounted for rotation in a vertical plane along the lawn edge, and means for rotating the movable blade.

12. In a device of the type described, a substantially vertical stationary blade depending from a supporting frame, and a movable cutting blade cooperating with said stationary blade and mounted for rotation in a vertical plane, said blade being provided with a bevelled rear edge for strengthening the blade and also for throwing aside the cut material.

13. A lawn trimmer comprising a supporting frame each side of which is carried upon a truck having a plurality of wheels in alignment along the lawn edge and providing a wheel base of substantial area, attaching means between the trucks and the frame permitting independent elevational adjustments of each side of the frame and having pivotal connections permitting the trucks to independently follow ground inclinations and cutting blades mounted upon said frame.

14. A trimmer comprising a supporting frame each side of which is carried upon a truck having a plurality of wheels in alignment along the direction of travel of the trimmer, and providing a wheel base of substantial area, attaching means between the trucks and the frame permitting independent elevational adjustments of each side of the frame, a stationary blade depending from the frame, an inclined finger extending forward from the lower edge of said blade for raising the material to be cut, a movable blade cooperating with said stationary blade and finger and mounted for rotation in a vertical plane, said blade being provided with a bevelled rear strengthening edge for also throwing aside the cut material, and an operating handle provided with means for rotating the movable blade.

15. A movable glass cutting blade cooperating with a stationary blade and mounted for rotation in a vertical plane along a lawn edge, said movable cutting blade being provided with a bevelled rear edge for strengthening the blade and also for throwing the cut grass from the lawn, and an operating handle provided with means for rotating the movable blade.

16. A lawn edge trimmer comprising a cutting blade rotatable in a plane parallel to the lawn edge, a supporting frame therefor, and trucks for said frame at each side of said blade, said trucks being pivotally connected to the frame for turning movement within planes parallel to the lawn edge thus permitting each truck to independently follow ground inclinations.

In testimony whereof I have signed my name to this specification.

ALFRED FELTON.